(No Model.)
W. W. DINGEE.
JOURNAL BEARING.
No. 544,482. Patented Aug. 13, 1895.
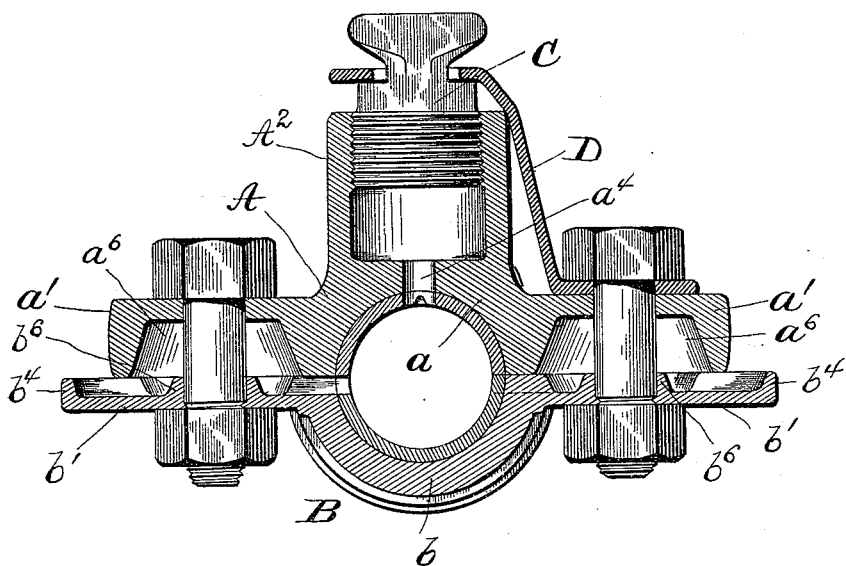
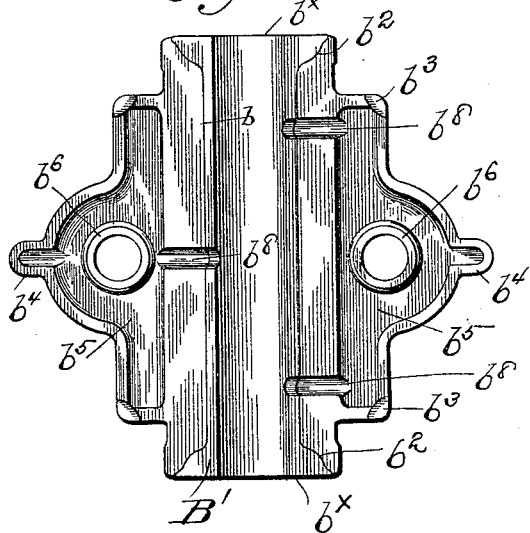 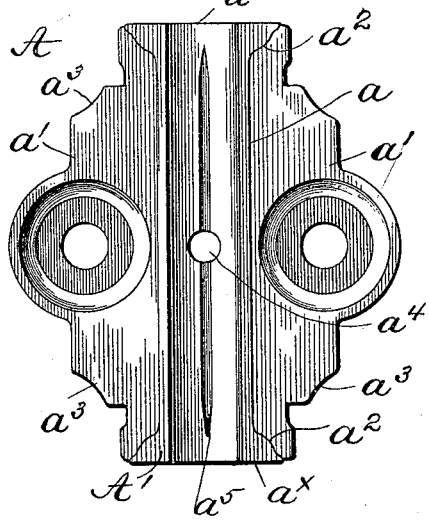
Witnesses
John Omine
J. D. Kingsbery
Inventor
William W. Dingee
By Whitaker & Prevost
Attorneys

UNITED STATES PATENT OFFICE.

WILLIAM W. DINGEE, OF RACINE, WISCONSIN, ASSIGNOR TO THE J. I. CASE THRESHING MACHINE COMPANY, OF SAME PLACE.

JOURNAL-BEARING.

SPECIFICATION forming part of Letters Patent No. 544,482, dated August 13, 1895.

Application filed June 18, 1895. Serial No. 553,222. (No model.)

*To all whom it may concern:*

Be it known that I, WILLIAM W. DINGEE, a citizen of the United States, residing at Racine, in the county of Racine and State of Wisconsin, have invented certain new and useful Improvements in Journal-Bearings; and I do hereby declare the following to be a full, clear, and exact description of the invention, such as will enable others skilled in the art to which it appertains to make and use the same.

My invention consists in the novel features hereinafter set forth, reference being had to the accompanying drawings, which illustrate one form in which I have contemplated embodying my invention, and said invention is fully disclosed in the following description and claims.

Referring to the said drawings, Figure 1 is a vertical transverse sectional view of my improved bearing. Fig. 2 is a top plan view of the lower sections of the bearing, and Fig. 3 is a bottom view of the upper section.

The object of my invention is to provide a journal-bearing particularly adapted for use for the cylinders of thrashing-machines, in which the intermediate cast-iron rib for retaining the Babbitt-metal lining is dispensed with and the Babbitt metal is so run as to form a wearing-face at each end of the bearing. I also provide for supplying the lower section of the bearing with oil or fluid lubricant and the upper section with hard grease.

In the drawings, A represents the upper section of my improved bearing having the semicylindrical portion $a$ to receive the lining, and provided with lateral flanges $a'$, having bolt-holes formed therein for securing the parts together. At each end of the cylindrical portion the metal is beveled from the inner edge outwardly, forming a semiannular recess $a^2$, as shown in Fig. 3. The flanges $a'$ are provided preferably at their corners with curved, notched, or recessed portions $a^3$ to engage projections on the other part of the bearing.

B represents the lower section of the bearing having the semicylindrical portion $b$ provided with semiannular recesses $b^2$ $b^2$ and lateral flanges $b'$. The flanges $b'$ are provided each with a laterally-extending projecting portion $b^4$, which extends beyond the outer edges of the upper section, as shown in Fig. 1, and each of said flanges is provided with an oil-holding recess $b^5$, which extends into the projection $b^4$, as shown in Figs. 1 and 2. In the central part of the recess $b^5$ I prefer to form an annular web $b^6$, surrounding the bolt-hole $b^6$, thus preventing the escape of oil. The flanges are also provided with upwardly-extending lugs $b^3$ at their corners to engage the recesses $a^3$ of the upper section when the parts are put together.

A' represents the Babbitt-metal lining of the upper section A, and B' represents the lining of section B. It will be observed that the lining extends in even thickness throughout the bearing except at the ends, where it extends outwardly and fills the annular recesses formed by the beveled edges of the bearing, and extends slightly beyond the end of the bearing, forming a bearing-face $a^\times$ $b^\times$ at each end of the bearing for the collars or hubs of pulleys on the shaft to engage.

The oil-recesses $b^5$ $b^5$ of the lower section communicate with the interior of the bearing by means of oil grooves or channels $b^8$ $b^8$ $b^8$, but in the bearing proper and in the Babbitt metal, as shown in Fig. 2, one groove being provided on one side of the bearing disposed centrally between two grooves on the other side.

The upper section of the bearing is provided centrally with an integral cup or grease-receptacle $A^2$, as shown, which has its upper end screw-threaded interiorly and a screw-plug C is fitted therein. The grease-receptacle $A^2$ communicates with the interior of the bearing by means of an aperture $a^4$ in the bottom, and I prefer to form a groove $a^5$ in the Babbitt metal at each side of said aperture, as shown in Fig. 3, to facilitate the distribution of the lubricant. The plug C is provided with a suitable bead, by means of which it may be turned by hand or by a wrench or other tool, and in order to prevent the loss of this plug I provide a flexible strap D, which engages the head of the plug at one end and has its other end secured to the bearing, as by passing one of the securing-bolts through it, as shown. In order to give ample room for the circulation of the oil in the lower section of the bearing, I prefer to form recesses $a^6$ $a^6$ in the upper section A adjacent to the bolts, as shown in Figs. 1 and 3.

In the drawings I have shown the two parts of the bearing bolted together in Fig. 1, but it will of course be understood that the securing-bolts will extend ordinarily through the support upon which the bearing rests.

In use the bearing will be supplied with oil by pouring it into the portion of the oil-recesses $b^5$ in the projections $b^4$ $b^4$, which extend beyond the upper section of the bearing. The receptacle C will be filled with hard grease and the screw-plug turned down until the grease is forced down into engagement with the shaft lying in the bearing.

By dispensing with the ordinary flange or web which is customarily used in bearings to prevent the Babbitt metal from flaring out at the ends I provide a bearing lined throughout with soft metal and having its ends also provided with a soft metal wearing-face to engage a collar or hub on the shaft, thus reducing friction and preventing the formation of grooves in the shaft, which is usual where the cast-iron retaining ribs or flanges are employed. By beveling or recessing the bearing at each end and running the said recesses full of the Babbitt metal I prevent any end-play of the lining and at the same time provide a wide bearing-surface of soft metal at the end of the bearing. By my improved construction I am also enabled to furnish the shaft with both fluid lubricant and hard grease, which is very advantageous in the case of shafts run at high speed. The hard-grease receptacle being formed or cast integrally with the top section of the bearing, it cannot be broken off or injured by the lateral movements of the belt, as would be the case in bearings for a thrashing-cylinder if the oil-receptacle was formed separately and attached to the bearing. It will also be observed that the whole bearing and the oil-receptacles are very well protected from dirt and dust, as it is practically impossible for any dust to get into the oil-receptacles.

What I claim, and desire to secure by Letters Patent, is—

1. A journal bearing provided with a fluid lubricant supply, a separate hard grease receptacle and a movable device in said hard grease receptacle for forcing the grease into the bearing, substantially as described.

2. A journal bearing provided with a fluid lubricant supply communicating with the interior of the bearing, a separate hard grease receptacle communicating with the interior of the bearing, and a screw plug engaging said receptacle for forcing the grease into the bearing, substantially as described.

3. A journal bearing comprising among its members a lower section provided with recesses for holding a fluid lubricant, an upper section, a receptacle for hard grease on the upper section, and a movable device in said receptacle for forcing the grease into the bearing, substantially as described.

4. A journal bearing comprising among its members an upper section, a receptacle for hard grease on said upper section provided with a movable device for forcing the grease into the bearing, a lower section having projections extending laterally beyond said upper section, the lower section being recessed to receive a fluid lubricant, said recesses extending into said projections, substantially as described.

5. A journal bearing including among its members an upper section, a receptacle for hard grease formed integrally therewith, a movable device in said receptacle to force the grease into the bearing, the lower section, having oil holding recesses, portions of said recessed lower section extending beyond the upper section forming oil inlets, substantially as described.

6. A journal bearing comprising among its members an upper section, a lower section having laterally extending flanges above the plane of the bottom of the interior of the bearing, and oil grooves connecting one of said recesses with the interior of the bearing and an oil groove intermediate said grooves for connecting the other recess with the interior of the bearing, substantially as described.

In testimony whereof I affix my signature in presence of two witnesses.

WILLIAM W. DINGEE.

Witnesses:
L. P. WHITAKER,
J. D. KINGSBERY.